United States Patent
Hu et al.

(10) Patent No.: US 11,334,150 B2
(45) Date of Patent: May 17, 2022

(54) METHOD AND DEVICE FOR CONTROLLING SCREEN VIEWING ANGLE AND FLEXIBLE DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xiaorui Hu, Beijing (CN); Zhouping Wang, Beijing (CN); Tao Wang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 648 days.

(21) Appl. No.: 16/321,585

(22) PCT Filed: May 17, 2018

(86) PCT No.: PCT/CN2018/087256
§ 371 (c)(1),
(2) Date: Jan. 29, 2019

(87) PCT Pub. No.: WO2019/056777
PCT Pub. Date: Mar. 28, 2019

(65) Prior Publication Data
US 2021/0349530 A1 Nov. 11, 2021

(30) Foreign Application Priority Data
Sep. 22, 2017 (CN) .......................... 201710865218.7

(51) Int. Cl.
G09G 5/00 (2006.01)
G06F 3/01 (2006.01)
G06F 1/16 (2006.01)

(52) U.S. Cl.
CPC ............ *G06F 3/013* (2013.01); *G06F 1/1652* (2013.01)

(58) Field of Classification Search
CPC .......... G06F 1/1652; G06F 3/013; G09F 9/30; G09F 9/301
See application file for complete search history.

(56) References Cited

U.S. PATENT DOCUMENTS

| | | | |
|---|---|---|---|
| 8,952,890 B2* | 2/2015 | Iida | G09G 3/20 345/156 |
| 2002/0105482 A1* | 8/2002 | Lemelson | G06F 3/013 345/7 |

(Continued)

FOREIGN PATENT DOCUMENTS

| | | |
|---|---|---|
| CN | 103167113 A | 6/2013 |
| CN | 103753593 A | 4/2014 |

(Continued)

OTHER PUBLICATIONS

International Search Report and Written Opinion for Application No. PCT/CN2018/087256, dated Aug. 1, 2018, 11 Pages.

*Primary Examiner* — Joe H Cheng
(74) *Attorney, Agent, or Firm* — Brooks Kushman P.C.

(57) ABSTRACT

The present disclosure provides a method and a device for controlling a screen viewing angle, and a flexible display device. The control method comprises: capturing one or more observers whose sight lines fall within a display area of a flexible screen; determining one or more viewing angles of the one or more observers relative to the display area; determining a curling angle based on the one or more (Continued)

viewing angles; and controlling the flexible screen to be curled according to the curling angle.

13 Claims, 4 Drawing Sheets

(56) References Cited

U.S. PATENT DOCUMENTS

| | | | |
|---|---|---|---|
| 2006/0050028 A1 | 3/2006 | Pasch et al. | |
| 2010/0002006 A1* | 1/2010 | Mauchly | H04N 13/398 345/581 |
| 2011/0095975 A1* | 4/2011 | Hwang | G06F 3/016 345/156 |
| 2011/0115887 A1* | 5/2011 | Yoo | H04N 13/398 348/51 |
| 2011/0135114 A1* | 6/2011 | Oba | G09G 3/3406 381/107 |
| 2012/0306910 A1* | 12/2012 | Kim | H04N 13/30 345/619 |
| 2013/0207946 A1* | 8/2013 | Kim | G09G 3/035 345/204 |
| 2015/0002643 A1* | 1/2015 | Jung | G02B 30/54 348/51 |
| 2016/0117962 A1* | 4/2016 | Jung | H04N 21/4122 345/156 |
| 2018/0364520 A1* | 12/2018 | Lee | G02F 1/133514 |
| 2019/0317609 A1* | 10/2019 | Zhang | G06F 3/0487 |

FOREIGN PATENT DOCUMENTS

| | | |
|---|---|---|
| CN | 103902042 A | 7/2014 |
| CN | 104463041 A | 3/2015 |
| CN | 105138303 A | 12/2015 |
| CN | 107632708 A | 1/2018 |

\* cited by examiner

METHOD AND DEVICE FOR CONTROLLING SCREEN VIEWING ANGLE AND FLEXIBLE DISPLAY DEVICE

CROSS-REFERENCE TO RELATED APPLICATIONS

This application is the U.S. national phase of PCT Application No. PCT/CN2018/087256 filed on May 17, 2018, which claims priority to Chinese Patent Application No. 201710865218.7 filed on Sep. 22, 2017, which are incorporated herein by reference in their entireties.

TECHNICAL FIELD

The present disclosure relates to the field of display technology, in particular to a method and a device for controlling a screen viewing angle, and a flexible display device.

BACKGROUND

A viewing angle of a display screen is a range of angles at which a user can clearly see all contents on the screen of a mobile phone from different directions.

In related art, the viewing angle of the display screen cannot be changed, and the following problems may occur in a specific application scenario: 1) in some special positions, sight lines of observers who want to look at the display screen fall within the display area of the screen, but viewing angles of the observers are not within a range of angles at which the contents on the screen are visible, which makes the observers cannot view the displayed contents normally; and 2) since the viewing angle of the display screen is fixed, the contents displayed on the screen may be peeped by unauthorized users, causing serious invasion of the user's privacy.

SUMMARY

In a first aspect, an embodiment of the present disclosure provides a method for controlling a screen viewing angle, which method includes: capturing one or more observers whose sight lines fall within a display area of a flexible screen; determining one or more viewing angles of the one or more observers relative to the display area; determining a curling angle based on the one or more viewing angles; and controlling the flexible screen to be curled according to the curling angle.

In some possible embodiments of the present disclosure, the viewing angle is a viewing angle of a first target observer among the observers, who needs to be shielded, relative to the display area, and the controlling the flexible screen to be curled according to the curling angle includes: controlling the flexible screen to be curled according to the curling angle such that the viewing angle is not within a range of angles at which contents of the display area are visible.

In some possible embodiments of the present disclosure, the viewing angle is a viewing angle of a second target observer among the observers, who does not need to be shielded, relative to the display area, and the controlling the flexible screen to be curled according to the curling angle includes: if the viewing angle is not within a range of angles at which contents of the display area are visible, controlling the flexible screen to be curled according to the curling angle such that the viewing angle falls within a changed range of angles at which the contents of the display area are visible.

In some possible embodiments of the present disclosure, the capturing the one or more observers whose sight lines fall within the display area of the flexible screen includes: capturing the one or more observers whose sight lines fall within the display area of the flexible screen based on a human eye recognition technique and/or a face recognition technique.

In some possible embodiments of the present disclosure, the determining the one or more viewing angles of the one or more observers relative to the display area includes: determining the first target observer among the observers, who needs to be shielded, if a current number of the observers whose sight lines fall within the display area is greater than a predetermined threshold; and determining a viewing angle of the first target observer relative to the display area.

In some possible embodiments of the present disclosure, prior to the controlling the flexible screen to be curled according to the curling angle, the method further includes: determining a viewing position of the first target observer relative to the display area; and the controlling the flexible screen to be curled according to the curling angle includes: controlling the flexible screen to be curled according to the curling angle in a direction corresponding to the viewing position.

In some possible embodiments of the present disclosure, the controlling the flexible screen to be curled according to the curling angle includes: controlling a short side of the flexible screen to be curled upwards in a counterclockwise direction according to the curling angle; controlling the short side of the flexible screen to be curled upwards in a clockwise direction according to the curling angle; controlling the short side of the flexible screen to be curled downwards in the counterclockwise direction according to the curling angle; controlling the short side of the flexible screen to be curled downwards in the clockwise direction according to the curling angle; controlling a long side of the flexible screen to be curled to the left in the counterclockwise direction according to the curling angle; controlling the long side of the flexible screen to be curled to the left in the clockwise direction according to the curling angle; controlling a long side of the flexible screen to be curled to the right in the counterclockwise direction according to the curling angle; or controlling the long side of the flexible screen to be curled to the right in the clockwise direction according to the curling angle.

In a second aspect, an embodiment of the present disclosure further provides a device for controlling a screen viewing angle, which device includes: a capturing circuit configured to capture one or more observers whose sight lines fall within a display area of a flexible screen; a viewing angle determining circuit configured to determine one or more viewing angles of the one or more observers relative to the display area; a curling angle determining circuit configured to determine a curling angle based on the one or more viewing angles; and a control circuit configured to control the flexible screen to be curled according to the curling angle.

In some possible embodiments of the present disclosure, the viewing angle is a viewing angle of a first target observer among the observers, who needs to be shielded, relative to the display area; and the control circuit is configured to control the flexible screen to be curled according to the curling angle such that the viewing angle is not within a range of angles at which contents of the display area are visible.

In some possible embodiments of the present disclosure, the viewing angle is a viewing angle of a second target observer among the observers, who does not need to be shielded, relative to the display area, and the control circuit is configured to, if the viewing angle is not within a range of angles at which contents of the display area are visible, control the flexible screen to be curled according to the curling angle such that the viewing angle falls within a changed range of angles at which the contents of the display area are visible.

In some possible embodiments of the present disclosure, the viewing angle determining circuit includes: a first determining sub-circuit configured to determine the first target observer among the observers, who needs to be shielded, if a current number of the observers whose sight lines fall within the display area is greater than a predetermined threshold; and a second determining sub-circuit configured to determine a viewing angle of the first target observer relative to the display area.

In some possible embodiments of the present disclosure, the control circuit is further configured to: control a short side of the flexible screen to be curled upwards in a counterclockwise direction according to the curling angle; control the short side of the flexible screen to be curled upwards in a clockwise direction according to the curling angle; control the short side of the flexible screen to be curled downwards in the counterclockwise direction according to the curling angle; control the short side of the flexible screen to be curled downwards in the clockwise direction according to the curling angle; control a long side of the flexible screen to be curled to the left in the counterclockwise direction according to the curling angle; control the long side of the flexible screen to be curled to the left in the clockwise direction according to the curling angle; control a long side of the flexible screen to be curled to the right in the counterclockwise direction according to the curling angle; or control the long side of the flexible screen to be curled to the right in the clockwise direction according to the curling angle.

In a third aspect, an embodiment of the present disclosure further provides a flexible display device, which includes: a flexible screen; the device according to the second aspect; and one or more deformation units disposed on the flexible screen, wherein the control circuit of the device is configured to generate an excitation source for exciting the one or more deformation units according to a curling angle, and the one or more deformation units are deformed under the control of the excitation source such that the flexible screen is curled according to the curling angle.

In some possible embodiments of the present disclosure, the deformation unit is a deformation unit composed of a magnetorheological fluid, and the excitation source is a magnetic field.

In some possible embodiments of the present disclosure, the deformation unit is an elastic cavity, and the control circuit includes a storage chamber in which gas or liquid is stored and which is connected to the elastic cavity; and one or more micro-motors provided corresponding to the one or more elastic cavities and configured to extract the gas or liquid from the storage chamber and convey the extracted gas or liquid to the one or more elastic cavities.

In some possible embodiments of the present disclosure, the elastic cavity is a transparent elastic cavity.

In some possible embodiments of the present disclosure, the storage chamber is connected to the one or more elastic cavities through a hollow pipe.

BRIEF DESCRIPTION OF THE DRAWINGS

To explain the embodiments of the present disclosure or technical solutions in the related art more clearly, the accompanying drawings necessary for describing the embodiments will be briefly described below. It will be apparent to a person having ordinary skills in the art that these drawings are merely some of the embodiments of the present disclosure and the other drawings can be obtained based on these drawings.

DETAILED DESCRIPTION

To make the technical problems, technical solutions and advantages of the present disclosure more clear, detailed description will be set forth below in conjunction with the drawings and the embodiments.

In the following description, particular details such as specific configurations and components are provided merely to help the comprehensive understanding of the embodiments of the present disclosure. It will be thus apparent to those skilled in the art that various changes and modifications may be made to the embodiments described herein without departing from the scope and spirit of the embodiments of the present disclosure. In addition, descriptions of well-known functions and constructions are omitted for clarity and conciseness.

It is to be understood that, the phrase "one embodiment" or "an embodiment" throughout the specification refers to particular features, structures, or characteristics related to the embodiment are included at least one embodiment of the present disclosure. Therefore, "in one embodiment" or "in an embodiment" throughout the specification does not necessarily refer to the same embodiment. Moreover, these particular features, structures, or characteristics may be combined in one or more embodiments in any suitable manner.

To solve the problem that the contents displayed on the traditional display screen are easily peeped by non-users due to the excessively wide viewing angle of the display screen, the embodiments of the present disclosure provide many solutions.

Figure 1:
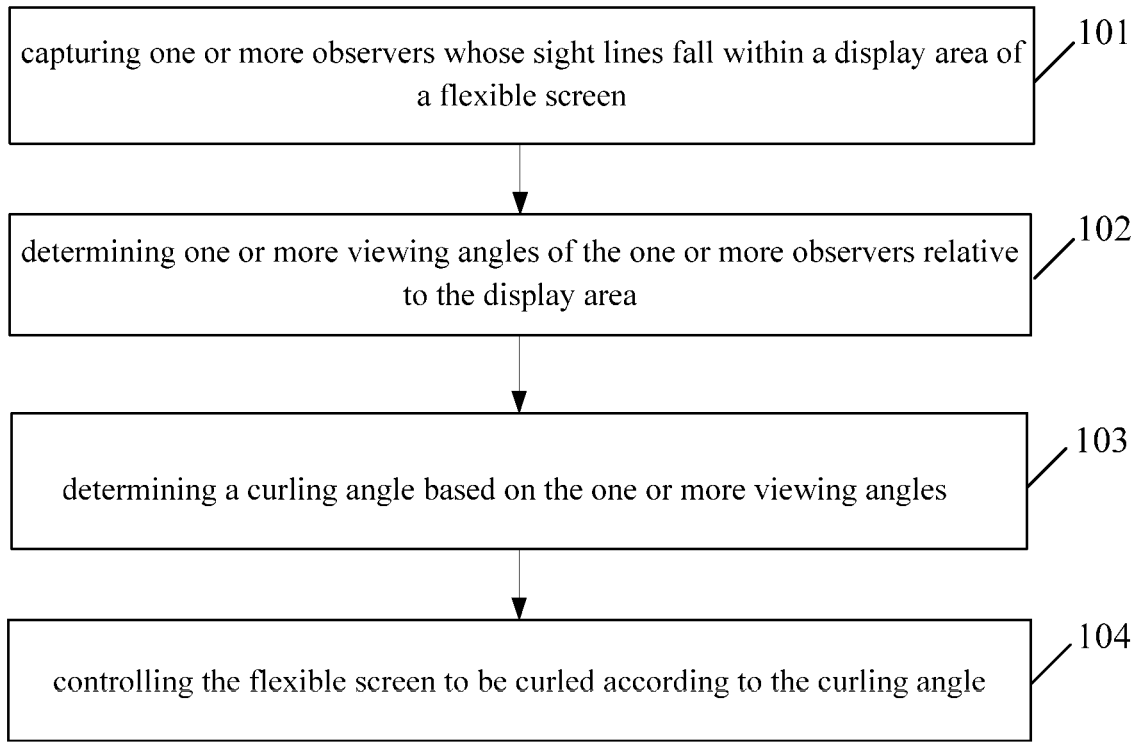
FIG. 1 is a schematic diagram illustrating steps of a method for controlling a screen viewing angle according to an embodiment of the present disclosure.

In one aspect, an embodiment of the present disclosure provides a method for controlling a screen viewing angle. As shown in FIG. 1, the method includes:

Step 101: capturing one or more observers whose sight lines fall within a display area of a flexible screen;

Step 102: determining one or more viewing angles of the one or more observers relative to the display area;

Step 103: determining a curling angle based on the one or more viewing angles; and Step 104: controlling the flexible screen to be curled according to the curling angle.

Based on the method of this embodiment, it is possible to actively identify the observers whose sight lines fall within the display area, determine the viewing angles of the observers relative to the display area, and control the flexible screen to be curled according to the viewing angles, so as to adjust angles at which contents of the display area are visible. In practical applications, a display angle of the display area relative to the observer can be optimized, or the display area can be controlled to be shielded from one or more peepers.

In the case of optimizing the display angle of the display area relative to the observer, the viewing angle of this embodiment is a viewing angle of a second target observer among the observers, who does not need to be shielded, relative to the display area.

When the above step 104 is performed, if the viewing angle is not within a range of angles at which contents of the display area are visible, the flexible screen is controlled to be curled according to the curling angle such that the viewing angle falls within a varied range of angles at which the contents of the display area are visible.

Obviously, based on the above design, the method of this embodiment is capable of controlling the flexible screen to actively adjust the display angle to be adapted to the observers, thereby providing a better viewing experience. Therefore, the method has high practical value.

Furthermore, in the case of controlling the display area to be shielded from the peepers, the viewing angle of the present embodiment is a viewing angle of a first target observer among the observers, who needs to be shielded, relative to the display area.

When the above step 104 is performed, the flexible screen is controlled to be curled according to the determined curling angle such that the viewing angle is not within a range of angles at which contents of the display area are visible.

Based on this design, the method of this embodiment is capable of enabling the flexible screen to actively identify the observers whose sight lines fall within the display area and determining, from the observers, an object that needs to be shielded. Then, the flexible screen is controlled to be curled to change the range of the angles at which the contents of the display area are visible, so that the object that needs to be shielded cannot view the contents of the display area, so as to realize an anti-peeping function.

Below, the anti-peeping function of this embodiment will be described in detail.

Illustratively, when the above step 101 is performed, the one or more observers whose sight lines fall within the display area of the flexible screen may be captured based on a human eye recognition technique and/or a face recognition technique.

For a display product, cameras have been very popular components. Therefore, in practical applications, the control method of this embodiment may adopt a camera to identify an orientation of a pupil and/or a face of a person, and compare it with the position of the display area. Any observer whose sight line has a tendency to fall or substantially falls within the display area of the flexible screen will be further determined in respect of whether he/she needs to be shielded.

Of course, in practical applications, some people may unconsciously turns their heads just to take a glance at the display area of the flexible screen, and the sight lines of these people tend to stay in the display area just for a short moment. Therefore, prior to the step 102, these people may be filtered in order to avoid excessively meaningless curling of the flexible screen.

Therefore, in this embodiment, when the above step 101 is performed, only the observers whose sight lines stay in the display area for a predetermined period of time may be captured, so that the target observer who intends to peek at the display area is screened out more accurately.

Furthermore, the control method of the embodiment is further capable of further curling the screen when it is clearly determined that there is a peeper. That is, when the above step 102 is performed, if a current number of the observers whose sight lines fall within the display area is greater than a predetermined threshold, a first target observer who needs to be shielded is determined from the observers, and a viewing angle of the first target observer relative to the display area is then determined.

In practical applications, the predetermined threshold may be flexibly set by the owner of the flexible screen. For example, in the case that two predetermined thresholds may be set according to actual requirements, when it is determined that there are three or more observers, it is determined that there is at least one peeper, and the first target observer who may have the peep intent is further determined therefrom.

Specifically, the control method of this embodiment may determine the target observer based on a certain determination rule. As an exemplary explanation, in a common situation, the peeper tends to avoid the attention of the owner of the flexible screen in the peeping process, and may thus maintain a certain distance from the flexible screen. Accordingly, based on this principle, a distance between each of the observers and the flexible screen may be also used to determine the first target observer in the embodiment.

For example, if there are five observers whose sight lines fall within the display area, and there are two predetermined thresholds set by the owner of the flexible screen, there may be three observers who are peeking at the display area. Therefore, the one of the three observers who is furthest from the flexible screen may be regarded as the first target observer in the embodiment.

It shall be noted that, the above rules for determining the target observer are merely illustrative, and are not intended to limit the protection scope of the embodiments of the present disclosure. Furthermore, the distance between the observer and the flexible screen may be obtained by existing sensors, and since the embodiment of the present disclosure does not involve improvements in this aspect, this will not be illustrated.

Further, after the target observer is determined, the flexible screen may be curled by the control method of this embodiment.

As exemplary description, prior to controlling the flexible screen to be curled, a viewing position of the target observer relative to the display area may be first determined by the control method of this embodiment. When the above step 104 is performed, the flexible screen may be controlled to be curled according to the curling angle in a direction corresponding to the viewing position.

Obviously, based on the above design, this embodiment can minimize an area of curling required for the flexible screen when performing the anti-peeping function, thereby avoiding the influence on the normal display of the flexible screen.

Figure 2:
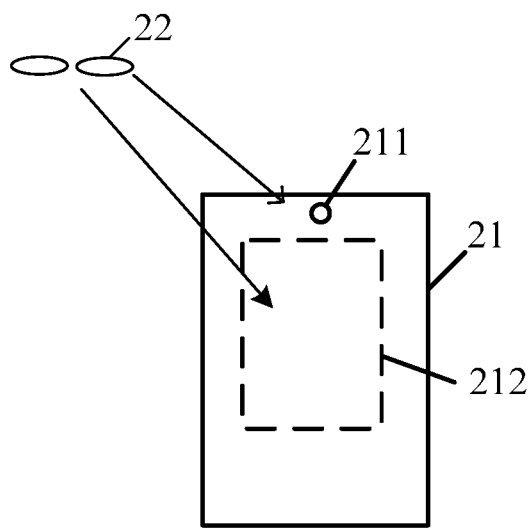
FIG. 2 is a schematic diagram showing a flexible screen prior to being curled by the method for controlling the screen viewing angle according to the embodiment of the present disclosure.
Figure 3:
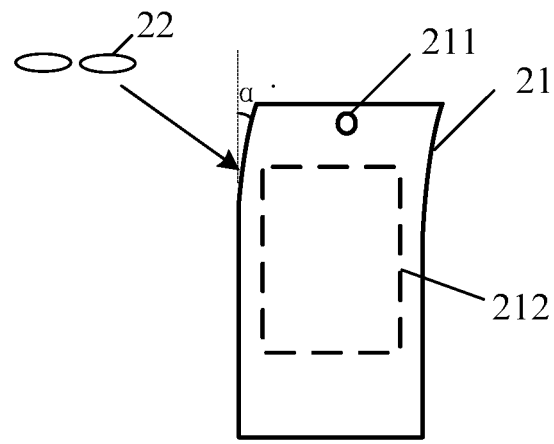
FIG. 3 is a schematic diagram showing the flexible screen after being curled by the method for controlling the screen viewing angle according to the embodiment of the present disclosure.

In practical applications, if the flexible screen of the embodiment is a mobile phone screen, as shown in FIG. 2, the control method of the embodiment adopts a front camera 211 of a mobile phone 21 to determine that a sight line of a target observer 22 who may have the peep intent falls within a display area 212 of the mobile phone 21. As shown in FIG. 3, the control method of the embodiment is used to control the flexible screen of the mobile phone 21 to be curled on a side corresponding to the target observer 22. For example, a short side of the flexible screen of the mobile phone 21 is curled upwards in a clockwise direction by a curling angle of α. In addition, it can be understood by a person skilled in the art that the short side of the flexible screen of the mobile phone 21 may be curled upwards in a counterclockwise direction, or the short side of the flexible screen of the mobile phone 21 is curled downwards in the clockwise direction or in the counterclockwise direction, or a long side of the flexible screen of the mobile phone 21 is curled to the left or to the right in the clockwise direction or in the counterclockwise direction. After the curling of the flexible screen, a range of angles at which the contents of the display area 212 are visible is reduced, so that the target observer 22 may no longer view the contents of the display area 212, thus realizing the anti-peeping function.

Figure 4:
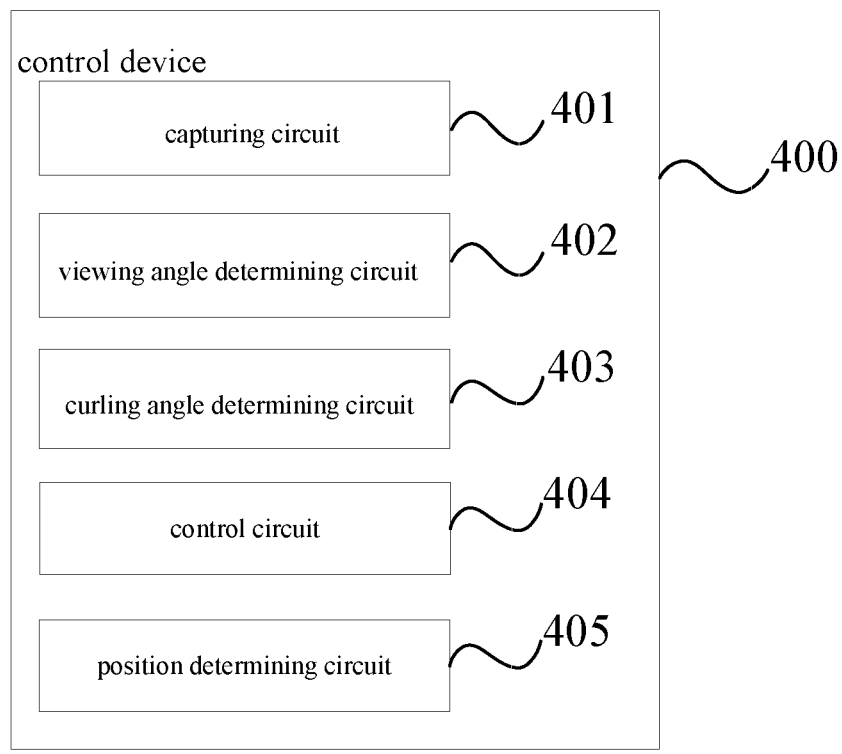
FIG. 4 is a schematic structural diagram of a device for controlling a screen viewing angle according to an embodiment of the present disclosure.

In another aspect, another embodiment of the present disclosure further provides a device 400 for controlling a screen viewing angle. As shown in FIG. 4, the method includes: a capturing circuit 401 configured to capture one or more observers whose sight lines fall within a display area of a flexible screen; a viewing angle determining circuit 402 configured to determine one or more viewing angles of the one or more observers relative to the display area; a curling angle determining circuit 403 configured to determine a curling angle based on the one or more viewing angles; and a control circuit 404 configured to control the flexible screen to be curled according to the curling angle.

Obviously, the control device of this embodiment is an execution subject of the control method as provided in the above embodiment. Therefore, the technical effects that can be achieved by the control method also apply to the control device of this embodiment.

Specifically, the capturing circuit 401 of this embodiment can capture the observers whose sight lines fall within the display area of the flexible screen based on a human eye recognition technique and/or a face recognition technique.

For a display product, cameras have been very popular components. Therefore, in practical applications, the capturing circuit 401 may identify an orientation of a pupil and/or face of a person by controlling the camera of the display product, and compare it with the position of the display area. Any observer whose sight line has a tendency to fall or substantially falls within the display area of the flexible screen will be further determined in respect of whether he/she needs to be shielded.

In practical applications, the viewing angle of the embodiment may be a viewing angle of a first target observer among the observers, who needs to be shielded, relative to the display area.

Correspondingly, the control circuit 404 is configured to control the flexible screen to be curled according to the determined curling angle such that the viewing angle is not within a range of angles at which the contents of the display area are visible.

Based on the above design, the control device of this embodiment is capable of enabling the flexible screen to actively identify the observers whose sight lines fall within the display area and determining, from the observers, an object that needs to be shielded. Then, the flexible screen is controlled to be curled to change the range of the angles at which the contents of the display area are visible, so that the object that needs to be shielded cannot view the contents of the display area, so as to realize the anti-peeping function.

Furthermore, in practical applications, the viewing angle of this embodiment may further be a viewing angle of a second target observer among the observers, who does not need to be shielded, relative to the display area.

Correspondingly, the control circuit 404 is configured to, if the viewing angle is not within a range of angles at which the contents of the display area are visible, control the flexible screen to be curled according to the curling angle such that the viewing angle falls within a varied range of angles at which the contents of the display area are visible.

Based on the above design, the control device of the embodiment is capable of controlling the flexible screen to actively adjust the display angle to be adapted to the observers, thereby providing a better viewing experience, and the control device thus has high practical value.

Below, detailed description will be given by taking an application of the control device 400 for controlling the range of the angles at which the contents of the display area are visible so as to achieve the shielding of peepers as an example.

Figure 6:
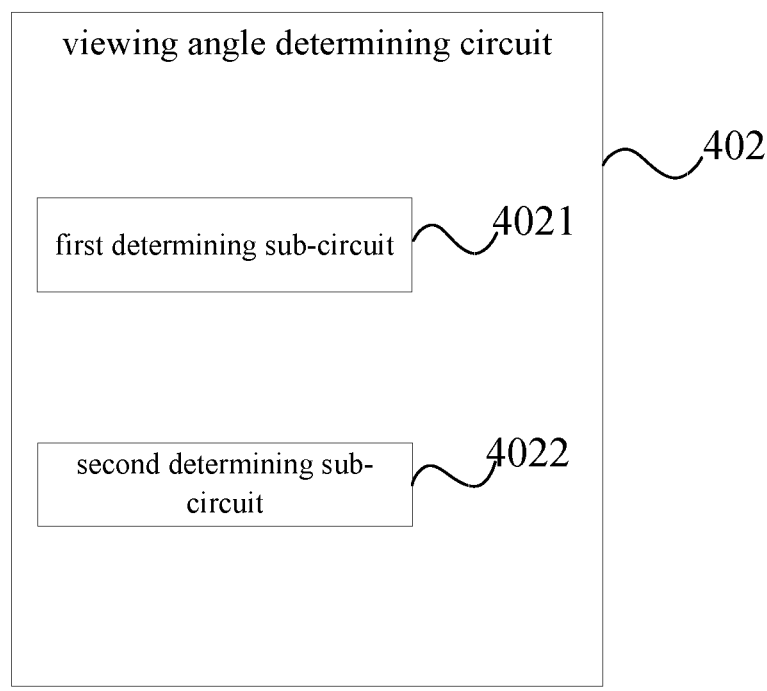
FIG. 6 is a schematic structural diagram of a viewing angle determining circuit 402 included in the device for controlling the screen viewing angle according to the embodiment of the present disclosure.

Specifically, as shown in FIG. 6, the viewing angle determining circuit 402 of this embodiment includes: a first determining sub-circuit 4021 configured to determine a target observer, who needs to be shielded, from observers whose sight lines fall within the display area if a current number of the observers is greater than a predetermined threshold; and a second determining sub-circuit 4022 configured to determine a viewing angle of the target observer relative to the display area.

In practical applications, the predetermined threshold may be flexibly set by the owner of the flexible screen. For example, in the case that two predetermined thresholds may be set according to actual requirements, when it is determined that there are three or more observers, it is determined that there is at least one peeper, and the first target observer who may have the peep intent is further determined therefrom.

Furthermore, as shown in FIG. 4, for example, the control device 400 of this embodiment may further include: a position determining unit 405 configured to determine a viewing position of the target observer relative to the display area before the control circuit 404 controls the flexible screen to be curled according to the curling angle.

Specifically, the control circuit 404 is configured to control the flexible screen to be curled on a side of the flexible screen close to the peeper in a direction corresponding to the viewing position, so that a less curling area is used more efficiently to achieve the anti-peeping function. Therefore, it is possible to reduce the impact of the curling on images displayed on the flexible screen.

Figure 5:
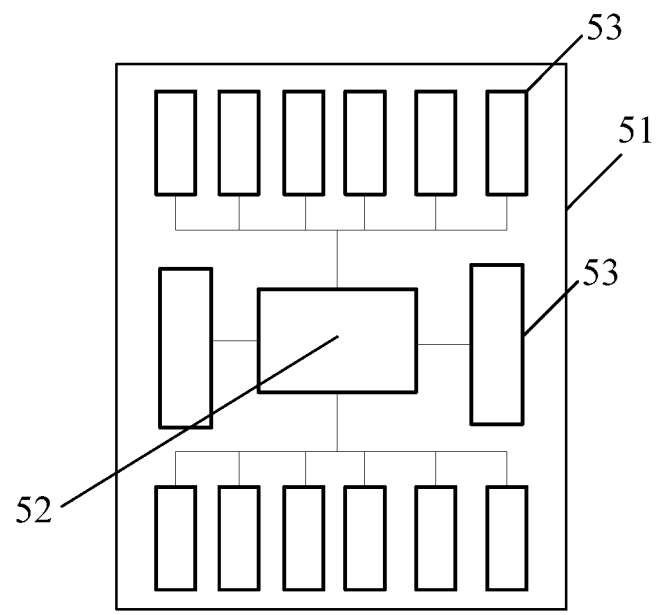
FIG. 5 is a schematic structural diagram of a flexible display device according to an embodiment of the present disclosure.

Furthermore, another embodiment of the present disclosure further provides a flexible display device. As shown in FIG. 5, the flexible display device includes: a flexible screen 51; the control device 52 provided in the above embodiment; and one or more deformation units 53 disposed on the flexible screen 51.

The control circuit of the control device 52 is configured to generate an excitation source of the one or more deformation units 53 according to the curling angle, and the one or more deformation units 53 are deformed under the control of the excitation source so that the flexible screen 51 is curled according to the curling angle.

In this embodiment, the one or more deformation units are provided on the flexible screen, and when the flexible screen is required to be curled, the deformation unit corresponding to the curling position may deform so as to cause the flexible screen to be curled. Thus, the flexible display device of this embodiment can achieve the anti-peeping function based on the control method provided in the above embodiment and protect the user's privacy, and thus has very high value.

In the following, the solution of curling the flexible screen of this embodiment will be described in detail in combination with a practical application.

Implementation 1

Figure 7:
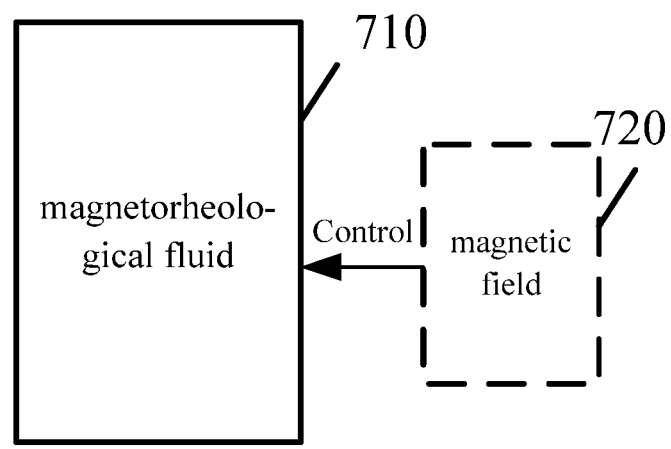
FIG. 7 is a schematic structural diagram of Implementation 1 according to an embodiment the present disclosure.

In Implementation 1, as shown in FIG. 7, the deformation unit is composed of a magnetorheological fluid 710, and the excitation source for controlling the deformation of the deformation unit is a magnetic field 720.

The control circuit 404 of the control device 400 may generate a magnetic field in an area corresponding to the deformation unit, and the deformation unit composed of the magnetorheological fluid 710 changes in shape under the control of the magnetic field (excitation source) 720, so as to cause the flexible screen to be curled.

In practical applications, the control circuit 404 may adjust magnitude and direction of the magnetic field 720 so as to realize precise control of the curling of the flexible screen.

Implementation 2

Figure 8:
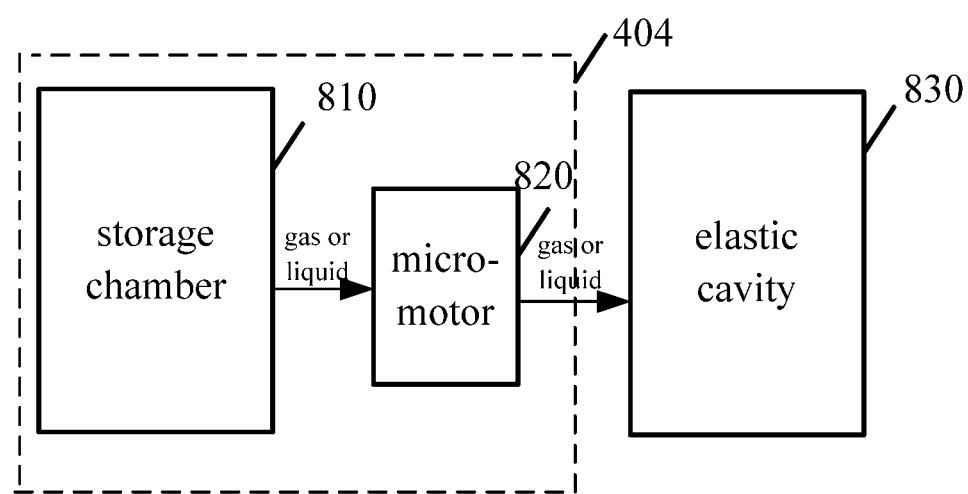
FIG. 8 is a schematic structural diagram of Implementation 2 according to another embodiment of the present disclosure.

In Implementation 2, as shown in FIG. 8, the deformation unit is an elastic cavity 830. Optionally, the elastic cavity 830 is a transparent elastic cavity.

Correspondingly, the control circuit 404 includes a storage chamber 810 in which gas or liquid is stored and which is connected to the elastic cavity 830 through a hollow pipe; one or more micro-motor 820 disposed corresponding to the one or more elastic cavities 830 and configured to extract the gas or liquid from the storage chamber 810 and convey the extracted gas or liquid to the one or more elastic cavities 830.

That is, the gas or liquid in the storage chamber 810 is the excitation source that can change the transparent elastic cavity 830.

When the deformation of the deformation unit is required, the micro-motor 820 extracts the gas or liquid from the storage chamber 810 under the control of the control circuit 404 and conveys the extracted gas or liquid to the transparent elastic cavity 830 through the hollow pipe (not shown), so that the elastic cavity 830 expands to cause the curling of the flexible screen.

In practical applications, the control circuit 404 may adjust a dose of the extracted gas or liquid from the storage chamber 810 so as to realize the precise control of the curling of the flexible screen.

Further, based on the above, as an optional solution, the flexible display device of the embodiment may further include a prompting unit (not shown) which can effectively prompt the user when the curling of the flexible screen for anti-peeping fails to realize the effective shielding of the peeper. The prompting unit is mainly configured to determine whether the flexible screen is curled in accordance with the curling angle and to control the flexible screen to show an anti-peeping indication, such as by showing an image on the display area to prompt the user or by driving a vibration motor of the flexible display device to prompt the user in a vibrating manner, when determining that the flexile screen cannot be curled in accordance with the curling angle.

Based on the design of the prompting unit of the embodiment, when the flexible display device cannot achieve the anti-peeping function through curling, the user may be further notified in time such that the user can take other measures promptly to protect personal privacy.

The above are preferred embodiments of the present disclosure, and it shall be indicated that several improvements and modifications can be made by a person having ordinary skills in the art without departing from the principle of the embodiments of the present disclosure, and such improvements and modifications should also be regarded as falling within the protection scope of the embodiments of the present disclosure.

Unless defined otherwise, the technical terms or scientific terms used herein should have meanings understood by the person having ordinary skills in the art to which the present disclosure pertains. The step numbers used in the method of the present disclosure do not represent any order, but are merely used to distinguish different parts. In addition, words such as "comprising", "including" or the like are intended to mean that the element or item in front of them covers the elements or items and equivalents thereof listed after them, but do not exclude other elements or items.

What is claimed is:

1. A method for controlling a screen viewing angle, comprising:
   capturing one or more observers whose sight lines fall within a display area of a flexible screen;
   determining one or more viewing angles of the one or more observers relative to the display area;
   determining a curling angle based on the one or more viewing angles; and
   controlling the flexible screen to be curled according to the curling angle,
   wherein the viewing angle is a viewing angle of a first target observer among the observers, who needs to be shielded, relative to the display area; and
   wherein the controlling the flexible screen to be curled according to the curling angle comprises: controlling the flexible screen to be curled according to the curling angle such that the viewing angle is not within a range of angles at which contents of the display area are visible,
   wherein the determining the one or more viewing angles of the one or more observers relative to the display area comprises:
   determining the first target observer among the observers, who needs to be shielded, if a current number of the observers whose sight lines fall within the display area is greater than a predetermined threshold; and determining a viewing angle of the first target observer relative to the display area.

2. The method according to claim 1, wherein the capturing the one or more observers whose sight lines fall within the display area of the flexible screen comprises: capturing the one or more observers whose sight lines fall within the display area of the flexible screen based on a human eye recognition technique and/or a face recognition technique.

3. The method according to claim 1, wherein prior to the controlling the flexible screen to be curled according to the curling angle, the method further comprises: determining a viewing position of the first target observer relative to the display area; and
the controlling the flexible screen to be curled according to the curling angle comprises: controlling the flexible screen to be curled according to the curling angle in a direction corresponding to the viewing position.

4. The method according to claim 1, wherein the controlling the flexible screen to be curled according to the curling angle comprises:
controlling a short side of the flexible screen to be curled upwards in a counterclockwise direction according to the curling angle;
controlling the short side of the flexible screen to be curled upwards in a clockwise direction according to the curling angle;
controlling the short side of the flexible screen to be curled downwards in the counterclockwise direction according to the curling angle;
controlling the short side of the flexible screen to be curled downwards in the clockwise direction according to the curling angle;
controlling a long side of the flexible screen to be curled to the left in the counterclockwise direction according to the curling angle;
controlling the long side of the flexible screen to be curled to the left in the clockwise direction according to the curling angle;
controlling the long side of the flexible screen to be curled to the right in the counterclockwise direction according to the curling angle; or
controlling the long side of the flexible screen to be curled to the right in the clockwise direction according to the curling angle.

5. A device for controlling a screen viewing angle, comprising:
a capturing circuit configured to capture one or more observers whose sight lines fall within a display area of a flexible screen;
a viewing angle determining circuit configured to determine one or more viewing angles of the one or more observers relative to the display area;
a curling angle determining circuit configured to determine a curling angle based on the one or more viewing angles; and
a control circuit configured to control the flexible screen to be curled according to the curling angle,
wherein the viewing angle is a viewing angle of a first target observer among the observers, who needs to be shielded, relative to the display area; and
wherein the control circuit is configured to control the flexible screen to be curled according to the curling angle such that the viewing angle is not within a range of angles at which contents of the display area are visible,
wherein the viewing angle determining circuit comprises:
a first determining sub-circuit configured to determine the first target observer among the observers, who needs to be shielded, if a current number of the observers whose sight lines fall within the display area is greater than a predetermined threshold; and
a second determining sub-circuit configured to determine a viewing angle of the first target observer relative to the display area.

6. The device according to claim 5, wherein the control circuit is further configured to:
control a short side of the flexible screen to be curled upwards in a counterclockwise direction according to the curling angle;
control the short side of the flexible screen to be curled upwards in a clockwise direction according to the curling angle;
control the short side of the flexible screen to be curled downwards in the counterclockwise direction according to the curling angle;
control the short side of the flexible screen to be curled downwards in the clockwise direction according to the curling angle;
control a long side of the flexible screen to be curled to the left in the counterclockwise direction according to the curling angle;
control the long side of the flexible screen to be curled to the left in the clockwise direction according to the curling angle;
control the long side of the flexible screen to be curled to the right in the counterclockwise direction according to the curling angle; or
control the long side of the flexible screen to be curled to the right in the clockwise direction according to the curling angle.

7. A flexible display device comprising:
a flexible screen;
a device for controlling a screen viewing angle, including: a capturing circuit configured to capture one or more observers whose sight lines fall within a display area of a flexible screen; a viewing angle determining circuit configured to determine one or more viewing angles of the one or more observers relative to the display area; a curling angle determining circuit configured to determine a curling angle based on the one or more viewing angles; and a control circuit configured to control the flexible screen to be curled according to the curling angle; and
one or more deformation units disposed on the flexible screen,
wherein the control circuit of the device is configured to generate an excitation source for exciting the one or more deformation units according to a curling angle, and the one or more deformation units are deformed under the control of the excitation source such that the flexible screen is curled according to the curling angle,
wherein the deformation unit includes a magnetorheological fluid, and the excitation source is a magnetic field.

8. The flexible display device according to claim 7, wherein the deformation unit is an elastic cavity, and the control circuit comprises:
a storage chamber in which gas or liquid is stored and which is connected to the elastic cavity; and
one or more micro-motors provided corresponding to the one or more elastic cavities and configured to extract the gas or liquid from the storage chamber and convey the extracted gas or liquid to the one or more elastic cavities.

9. The flexible display device according to claim 8, wherein the elastic cavity is a transparent elastic cavity.

10. The flexible display device according to claim 8, wherein the storage chamber is connected to the one or more elastic cavities through a hollow pipe.

11. The flexible display device according to claim 7, wherein the viewing angle is a viewing angle of a first target observer among the observers, who needs to be shielded, relative to the display area; and wherein the control circuit is configured to control the flexible screen to be curled according to the curling angle such that the viewing angle is not within a range of angles at which contents of the display area are visible.

12. The flexible display device according to claim 7, wherein the viewing angle is a viewing angle of a second target observer among the observers, who does not need to be shielded, relative to the display area; and wherein the control circuit is configured to, if the viewing angle is not within a range of angles at which contents of the display area are visible, control the flexible screen to be curled according to the curling angle such that the viewing angle falls within a varied range of angles at which the contents of the display area are visible.

13. The flexible display device according to claim 12, wherein the viewing angle determining circuit comprises:

a first determining sub-circuit configured to determine the first target observer among the observers, who needs to be shielded, if a current number of the observers whose sight lines fall within the display area is greater than a predetermined threshold; and a second determining sub-circuit configured to determine a viewing angle of the first target observer relative to the display area.

* * * * *